Aug. 26, 1941. L. M. KLEIN Re. 21,887

TOBACCO POUCH

Original Filed Sept. 22, 1937

INVENTOR
Louis M. Klein
BY Zoltan P. Polachek
ATTORNEY

Reissued Aug. 26, 1941

Re. 21,887

UNITED STATES PATENT OFFICE 21,887

TOBACCO POUCH

Louis M. Klein, New York, N. Y., assignor to American Pouch Corporation, a corporation of Illinois Original No. 2,161,474, dated June 6, 1939, Serial No. 165,102, September 22, 1937. Application for reissue September 6, 1940, Serial No. 355,636

11 Claims. (Cl. 229—87.5)

This invention relates to new and useful improvements in a tobacco pouch.

The invention has for an object the construction of a pouch adapted to hold tobacco and which is capable of being sealed to retain the aroma and fragrance of the tobacco.

Still further the invention proposes to reinforce the edges of sheet material used in constructing the pouch by folding or bending the edge portions thereof inwards.

Still further the invention contemplates the use of tacky material along a portion of the pouch by which it may be sealed closed.

Still further the invention contemplates the association of a reinforcement strip in the vicinity of the tacky material to hold the parts in this area relatively stiff to better insure maintaining the adhesive connection for closing the pouch.

Another one of the objects of this invention is to provide an arrangement by which the tacky material may be protected from the tobacco when the pouch is opened to remove some of the tobacco.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure.

Figure 1:
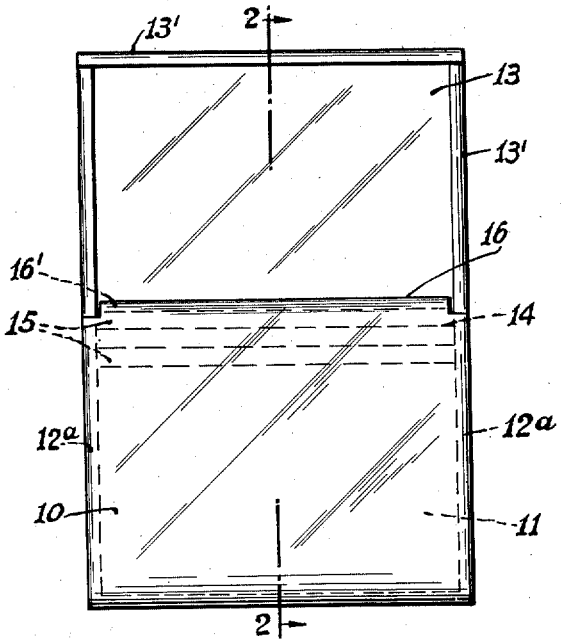
Fig. 1 is an elevational view of a tobacco pouch constructed according to this invention and shown with the front flap opened.

The pouch comprises a strip of material having a front panel 10 and a rear panel 11 joined at the bottom and the sides, forming a container 12 which is open at the top 12'. A flap portion 13 continues from the top edge of the rear panel 11. A reinforcing strip of relatively stiff material 14 is attached on the edge portion of the front panel 10 and is spaced in slightly from the free edge thereof and extends the entire width of the container. Tacky material 15 is disposed on the inner face of the front panel to the sides of the strip 14 and is adapted to stick on the rear panel when the front and rear panels are forced together to close the pouch.

The flap portion 13 has its edges finished by reason of edge portions of material 13' being folded inwards and secured downwards in this position. In a similar fashion the edge portions 12a of the front and rear panels are bent inwards and secured together. This edge reinforcement may be in the form of separate binding strips, secured to the edges of the front and rear panels 10 and 11 by any suitable cement. A heat-sealing reinforced edge may also be used preferably in the form of a binding, or in any other suitable manner. At the top the front panel 10 is formed with a tab portion 16 which has an edge portion 16' bent inwards to form a finished tab portion. This tab portion 16 is devoid of tacky material so that it is always free and may be used to open the pouch by pulling apart the tacky material when the front and rear panels are joined together by the tacky material, and thus the pouch is closed.

Figure 3:
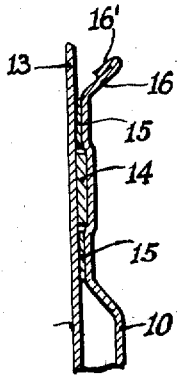
Fig. 3 is a fragmentary enlarged view of the center portion of Fig. 2 but illustrating the condition of the parts when the pouch is sealed closed.
Figure 2:
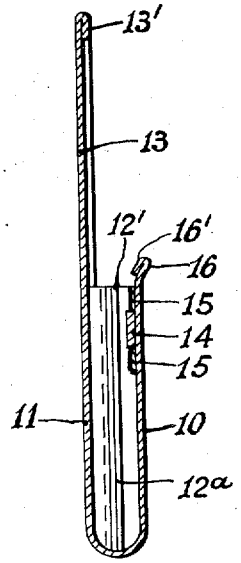
Fig. 2 is a vertical sectional view taken on the line 2—2 of Fig. 1.

In Fig. 3 the closed position of the pouch is shown and it should be noted the manner in which the tab 16 projects so that it may be readily gripped. Furthermore, it should be noted that the reinforcing strip 14 serves to keep the area of the pouch which is sealed, relatively stiff and so insures a proper sealing and proper encasing and retaining of the aroma and fragrance of tobacco in the pouch.

Figure 4:
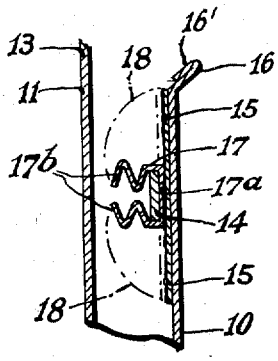
Fig. 4 is a view similar to the central portion of Fig. 2 but illustrating a modified form of the invention.

In Fig. 4 a modified form of the invention has been disclosed in which a strip of flexible material 17 is provided and arranged in a manner so as normally to extend over the front face of the reinforcing strip 14 and adapted, when desired, to be extended outwards to engage over and cover the tacky material 15. This flexible strip 17 has a central portion 17a thereof extended between the inner face of the strip 14 and the material of the front panel 10. The edge portions 17b of the flexible strip 17 are formed with accordion-shaped portions which normally extend to the front of the strip 14 and which may be extended over the tacky material 15 as indicated by the dot and dash lines 18.

To seal the pouch shown in Fig. 4, it is merely necessary that the front and rear panels be forced together so that the tacky material 15 connects with the rear panel of the pouch. When the pouch is opened and some of the tobacco is to be removed for smoking purposes, the flexible strip portions 17b are engaged over the tacky material to prevent some of the tobacco from adhering to the tacky material which would interfere with a proper reclosure of the container.

The pouches according to this invention may be made of any desired size and used for keeping other substance than tobacco therein for retaining the flavor and aroma of the said substance.

A convenient and efficient material for my pouches is Cellophane. It will be understood that other sheet materials may be employed, preferably but not necessarily transparent or translucent. It will be further understood that the shape of my pouch may be widely varied, and whereas I have shown the conventional tobacco pouch, the flap 13 being of substantial length, such flap may be omitted or varied substantially in length and form.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A tobacco pouch comprising a strip of sheet material having front and rear panels joined at the bottom and sides forming a container open at the top, and a flap portion continuing from the top edge of the rear panel, a reinforcing strip of relatively stiff material attached on the edge portion of the front panel and spaced in slightly from the free edge thereof and extending the width of the container, the inner surfaces of said pouch being formed of non-tacky and non-cohesive material and tacky material on the inner face of the front panel to either side of said reinforcing strip and adapted to stick on the rear panel to close the pouch.

2. A tobacco pouch comprising a strip of sheet material having front and rear panels joined at the bottom and sides forming a container open at the top, and a flap portion continuing from the top edge of the rear panel, a reinforcing strip of relatively stiff material attached on the edge portion of the front panel and spaced in slightly from the free edge thereof and extending the width of the container, the inner surfaces of said pouch being formed of non-tacky and non-cohesive material and tacky material on the inner face of the front panel to either side of said reinforcing strip and adapted to stick on the rear panel to close the pouch, said strip of sheet material having its edge finished by folding the edge portions thereof inwards and securing them in this position.

3. A pouch comprising a strip of sheet material having front and rear panels joined at the bottom and sides forming a container open at the top, and a flap portion continuing from the top edge of the rear panel, a reinforcing strip of relatively stiff material attached on the edge portion of the front panel and spaced in slightly from the free edge thereof and extending the width of the container, the inner surfaces of said pouch being formed of non-tacky and non-cohesive material and tacky material on the inner face of the front panel to either side of said reinforcing strip and adapted to stick on the rear panel to close the pouch, said front panel having a tab portion extending from the said free top edge of said front panel and devoid of tacky material.

4. A tobacco pouch comprising a strip of sheet material having front and rear panels joined at the bottom and sides forming a container open at the top, and a flap portion continuing from the top edge of the rear panel, a reinforcing strip of relatively stiff material attached on the edge portion of the front panel and spaced in slightly from the free edge thereof and extending the width of the container, the inner surfaces of said pouch being formed of non-tacky and non-cohesive material and tacky material on the inner face of the front panel to either side of said reinforcing strip and adapted to stick on the rear panel to close the pouch, said front panel having a tab portion extending from the said free top edge of said front panel and devoid of tacky material, said tab portion having a bent-down edge portion to finish same.

5. A tobacco pouch comprising a strip of sheet material having front and rear panels joined at the bottom and sides forming a container open at the top, and a flap portion continuing from the top edge of the rear panel, a reinforcing strip of relatively stiff material attached on the edge portion of the front panel and spaced in slightly from the free edge thereof and extending the width of the container, tacky material on the inner face of the front panel to either side of said reinforcing strip and adapted to stick on the rear panel to close the pouch, and a spacer strip of flexible material secured in the vicinity of said reinforcing strip and normally extended across the face of the reinforcing strip and adapted to be extended across said tacky material.

6. A tobacco pouch comprising a strip of sheet material having front and rear panels joined at the bottom and sides forming a contained open at the top, and a flap portion continuing from the top edge of the rear panel, a reinforcing strip of relatively stiff material attached on the edge portion of the front panel and spaced in slightly from the free edge thereof and extending the width of the container, tacky material on the inner face of the front panel to either side of said reinforcing strip and adapted to stick on the rear panel to close the pouch, and a spacer strip of flexible material secured in the vicinity of said reinforcing strip and normally extended across the face of the reinforcing strip and adapted to be extended across said tacky material, the edge portions of said spacer strip having accordion-folded portions.

7. A tobacco pouch comprising a strip of sheet material having front and rear panels joined at the bottom and sides forming a container open at the top, and a flap portion continuing from the top edge of the rear panel, a reinforcing strip of relatively stiff material attached on the edge portion of the front panel and spaced in slightly from the free edge thereof and extending the width of the container, tacky material on the inner face of the front panel to either side of said reinforcing strip and adapted to stick on the rear panel to close the pouch, and a spacer strip of flexible material secured in the vicinity of said reinforcing strip and normally extended across the face of the reinforcing strip and adapted to be extended across said tacky material, the edge portions of said spacer strip having accordion-folded portions, and the central portion of the spacer strip being extended in between the reinforcing strip and the front panel.

8. A tobacco pouch, comprising material in the form of a pouch container open at the top and a flap portion continuing from one of the sides of the container for closing same, a reinforcing strip of relatively stiff material attached on said container along said open top and spaced in slightly from the free edge of said opening, the inner surface of said pouch being formed of non-tacky and non-cohesive material and tacky material on the inner face of one wall of said container along one edge of said reinforcing strip and adapted to stick on the wall of said container to close the open top thereof.

9. A tobacco pouch, comprising material in the form of a pouch container open at the top and a flap portion continuing from one of the sides of the container for closing same, a reinforcing strip of relatively stiff material attached on said container along said open top and spaced in slightly from the free edge of said opening, the inner surfaces of said pouch being formed of non-tacky and non-cohesive material and tacky material on the inner face of said container along along an edge of said reinforcing strip and adapted to stick on the opposite side of the opening to close said container, said tacky material being spaced in from the free edge of said open top so that there is a free edge portion usable as a grip for pulling open the closed container.

10. A tobacco pouch, comprising material in the form of a pouch container open at the top and a flap portion continuing from one of the sides of the container for closing same, a reinforcing strip of relatively stiff material attached on said container along said open top and spaced in slightly from the free edge of said opening, and tacky material on the inner face of said container along an edge of said reinforcing strip and adapted to stick on the opposite side of the opening to close said container, said tacky material being spaced in from the free edge of said open top so that there is a free edge portion usable as a grip for pulling open the closed container, and a flexible strip mounted on said pouch container and extendable over said tacky material to protect same when the container is open.

11. A tobacco pouch, comprising material in the form of a pouch container open at the top and a flap portion continuing from one of the sides of the container for closing same, a reinforcing strip of relatively stiff material attached on said container along said open top and spaced in slightly from the free edge of said opening, the inner surfaces of said pouch being formed of non-tacky and non-cohesive material and tacky material on the inner face of said container, along an edge of said reinforcing strip and adapted to stick on the opposite side of the opening to close said container, said reinforcing strip being on the inner face of said container.

LOUIS M. KLEIN.